(12) United States Patent
Deshpande

(10) Patent No.: US 11,689,724 B2
(45) Date of Patent: Jun. 27, 2023

(54) SYSTEMS AND METHODS FOR REFERENCE OFFSET SIGNALING IN VIDEO CODING

(71) Applicants: SHARP KABUSHIKI KAISHA, Sakai (JP); FG Innovation Company Limited, Tuen Mun (HK)

(72) Inventor: Sachin G. Deshpande, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/289,957

(22) PCT Filed: Oct. 29, 2019

(86) PCT No.: PCT/JP2019/042436
§ 371 (c)(1),
(2) Date: Apr. 29, 2021

(87) PCT Pub. No.: WO2020/090841
PCT Pub. Date: May 7, 2020

(65) Prior Publication Data
US 2022/0014750 A1 Jan. 13, 2022

Related U.S. Application Data

(66) Substitute for application No. 62/755,240, filed on Nov. 2, 2018.
(Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11); *H04N 19/70* (2014.11)

(58) Field of Classification Search
CPC .... H04N 19/70; H04N 19/132; H04N 19/105; H04N 19/55; H04N 19/176; H04N 19/186
See application file for complete search history.

(56) References Cited

U.S. PATENT DOCUMENTS

| | | | | |
|---|---|---|---|---|
| 5,610,657 A | * | 3/1997 | Zhang | H04N 19/42 375/E7.226 |
| 2017/0085917 A1 | * | 3/2017 | Hannuksela | H04N 19/30 |

(Continued)

OTHER PUBLICATIONS

Philippe Hanhart et al., "CE13: PERP with horizontal geometry padding of reference pictures (Test 3.3)", JVET-L0231-r2, Joint Video Experts Team (JVET) of ITU-T SG 16 WP 3 and ISO/IEC JTC 1/SC 29/WG 11, 12th Meeting Macau, CN, Oct. 3-12, 2018.
(Continued)

*Primary Examiner* — Neil R Mikeska
(74) *Attorney, Agent, or Firm* — ScienBiziP, P.C.

(57) ABSTRACT

A method of deriving prediction sample values for decoding video data by a device is provided. A reference wraparound offset syntax specifying an offset used for computing a horizontal wrap-around position is decoded. A luma location is derived based on a product of a value of the reference wraparound offset syntax and a minimum coding block size. A predicted luma sample value is derived by using the luma location.

15 Claims, 7 Drawing Sheets

Related U.S. Application Data

(60) Provisional application No. 62/784,072, filed on Dec. 21, 2018.

(51) Int. Cl.
    *H04N 19/176*     (2014.01)
    *H04N 19/186*     (2014.01)
    *H04N 19/70*     (2014.01)

(56) References Cited

U.S. PATENT DOCUMENTS

2019/0222859 A1*   7/2019   Chuang ................ H04N 19/00
2020/0275124 A1*   8/2020   Ko ...................... H04N 19/176
2020/0296417 A1*   9/2020   Ko ...................... H04N 19/105

OTHER PUBLICATIONS

Telecommunication Standardization Sector of ITU, Series H: Audiovisual and Multimedia Systems Infrastructure of audiovisual services—Coding of moving video, High efficiency video coding, Recommendation ITU-T H.265, Apr. 2013.

Jianle Chen et al., Output document of JVET, "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11 7th Meeting: Torino, IT, Jul. 13-21, 2017.

Benjamin Bross et al., "Versatile Video Coding (Draft 3)", JVET-L1001-v4. Joint Video Experts Team (JVET) of ITU-T SG 16 WP 3 and ISO/IEC JTC 1/SC 29/WG 11 12th Meeting: Macao, CN, Oct. 3-12, 2018.

Benjamin Brass, Output document approved by JVET, "Versatile Video Coding (Draft 1)", JVET-J1001-v2, Joint Video Experts Team (JVET) of ITU-T SG 16 WP 3 and ISO/IEC JTC 1/SC 29/WG 11 10th Meeting: San Diego, US, Apr. 10-20, 2018.

Benjamin Brass et al., Output document approved by JVET, "Versatile Video Coding (Draft 2)", JVET-K1001-v5, Joint Video Experts Team (JVET) of ITU-T SG 16 WP 3 and ISO/IEC JTC 1/SC 29/WG 11 11th Meeting: Ljubljana, SI, Jul. 10-18, 2018.

International Telecommunication Union, "Advanced video coding for generic audiovisual services", Series H: Audiovisual and Multimedia Systems Infrastructure of audiovisual services—Coding of moving video, ITU-T H.264(Apr. 2017).

International Telecommunication Union, "High efficiency video coding", Series H: Audiovisual and Multimedia Systems Infrastructure of audiovisual services—Coding of moving video, ITU-T H.265(Dec. 2016).

"Advanced video coding for generic audiovisual services",Series H: Audiovisual and Multimedia Systems Infrastructure of audiovisual services—Coding of moving video, ITU-T H.264 (Nov. 2007).

* cited by examiner

[Fig. 5]

SYSTEMS AND METHODS FOR REFERENCE OFFSET SIGNALING IN VIDEO CODING

CROSS-REFERENCE TO RELATED APPLICATION(S)

This present disclosure is a national stage application of International Patent Application PCT/JP2019/042436, filed on Oct. 29, 2019, now published as WO2020/090841, which claims the benefit of and priority to U.S. Provisional Patent Application Ser. No. 62/755,240, filed on Nov. 2, 2018 and U.S. Provisional Patent Application Ser. No. 62/784,072, filed on Dec. 21, 2018. The contents of U.S. Provisional Patent Applications 62/755,240 and 62/784,072, and International Patent Application PCT/JP2019/042436 are hereby incorporated fully by reference into the present disclosure.

TECHNICAL FIELD

This disclosure relates to video coding and more particularly to techniques for reference offset signaling.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the $10^{th}$ Meeting of ISO/IEC JTC1/SC29/WG1116-20 Apr. 2018, San Diego, Calif. As a result of the multiple descriptions of video coding, a draft text of a video coding specification is described in "Versatile Video Coding (Draft 1)," $10^{th}$ Meeting of ISO/IEC JTC1/SC29/WG11 16-20 Apr. 2018, San Diego, Calif., document JVET-J1001-v2, which is incorporated by reference herein, and referred to as JVET-J1001. "Versatile Video Coding (Draft 2)," 11th Meeting of ISO/IEC JTC1/SC29/WG1110-18 Jul. 2018, Ljubljana, SI, document JVET-K1001-v7, which is incorporated by reference herein, and referred to as JVET-K1001, is an update to JVET-J1001.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (e.g., groups of frames within a video sequence, a frame within a group of frames, regions within a frame, video blocks within a region, and sub-blocks within a video block). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method of deriving prediction sample values for decoding video data is provided. The method comprises decoding a reference wraparound offset syntax specifying an offset used for computing a horizontal wrap-around position; deriving a luma location based on a product of a value of the reference wraparound offset syntax and a minimum coding block size; and deriving a predicted luma sample value by using the luma location.

In one example, a method of deriving prediction sample values for encoding data is provided. The method comprises encoding a reference wraparound offset syntax specifying an offset used for computing a horizontal wrap-around position; deriving a luma location based on a product of a value of the reference wraparound offset syntax and a minimum coding block size; and deriving a predicted luma sample value by using the luma location.

In one example, a device for deriving prediction sample values for decoding video data is provided. The device comprises one or processors; and a storage device coupled to the one or more processors and storing a program which, when executed by the one or more processors, causes the one or more processors to: decode a reference wraparound offset syntax specifying an offset used for computing a horizontal wrap-around position; derive a luma location based on a product of a value of the reference wraparound offset syntax and a minimum coding block size; and derive a predicted luma sample value by using the luma location.

DESCRIPTION OF EMBODIMENTS

Figure 1:
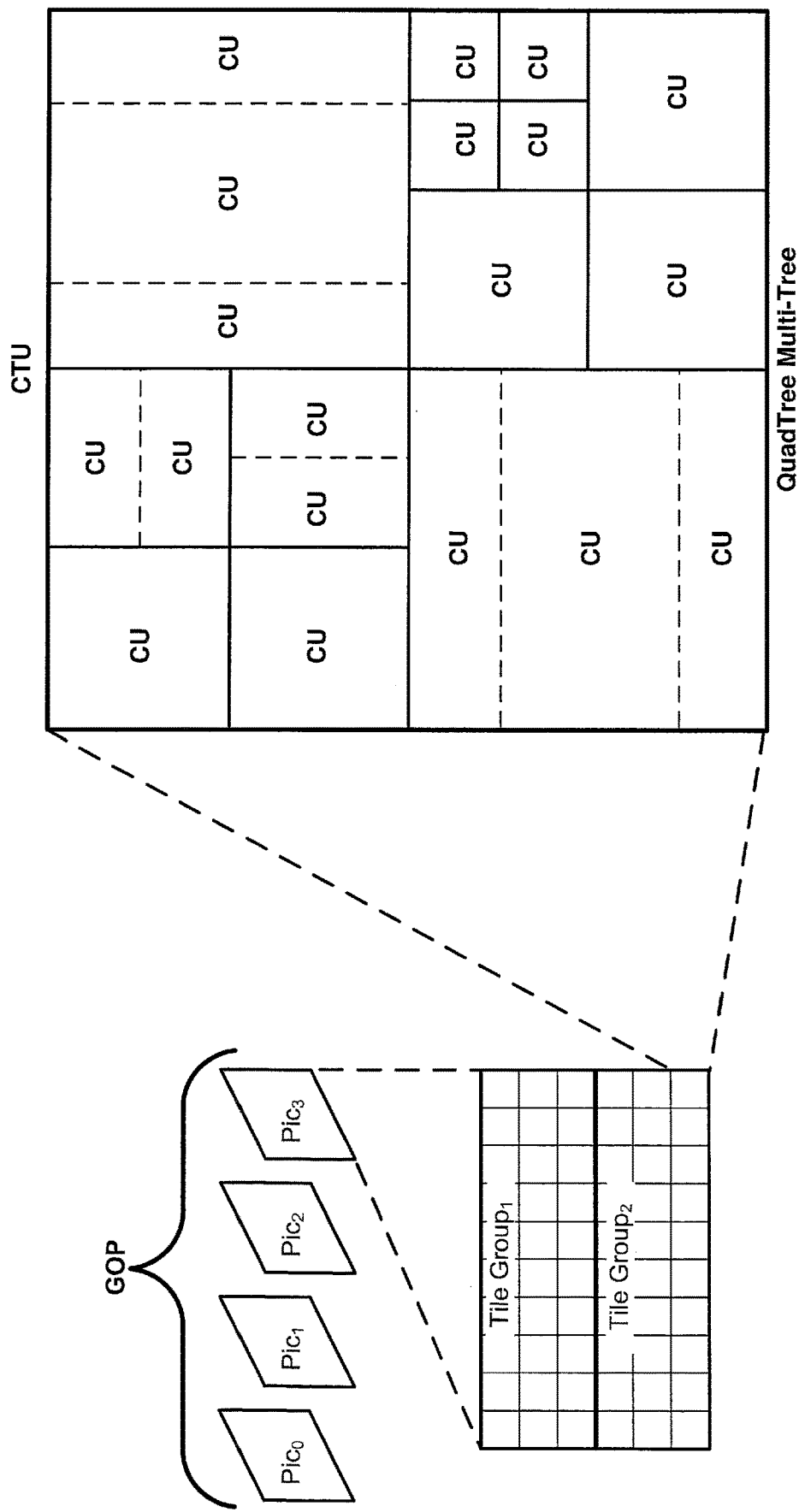
FIG. 1 is a conceptual diagram illustrating an example of a group of pictures coded according to a quad tree multi tree partitioning in accordance with one or more techniques of this disclosure.

In general, this disclosure describes various techniques for coding video data. In particular, this disclosure describes techniques for reference offset signaling in video coding. Performing reference offset signaling according to the techniques described herein may be particularly useful for improving video coding signaling efficiency. It should be noted that although techniques of this disclosure are described with respect to ITU-T H.264, ITU-T H.265, JVET-J1001, and JVET-K1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, JVET-J1001, and JVET-K1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method comprises determining a reference picture offset value, and encoding a value of a syntax element indicating the reference picture offset into a bitstream, wherein a value of zero for the syntax element indicates wrap-around motion compensation is not used and a value other than zero for the syntax element indicates the reference picture offset value in units of a minimum coding block size.

In one example, a device comprises one or more processors configured to determine a reference picture offset value, and encode a value of a syntax element indicating the reference picture offset into a bitstream, wherein a value of zero for the syntax element indicates wrap-around motion compensation is not used and a value other than zero for the syntax element indicates the reference picture offset value in units of a minimum coding block size.

In one example, a non-transitory computer-readable storage medium comprises instructions stored thereon that, when executed, cause one or more processors of a device to determine a reference picture offset value, and encode a value of a syntax element indicating the reference picture offset into a bitstream, wherein a value of zero for the syntax element indicates wrap-around motion compensation is not used and a value other than zero for the syntax element indicates the reference picture offset value in units of a minimum coding block size.

In one example, an apparatus comprises means for determining a reference picture offset value, and means for encoding a value of a syntax element indicating the reference picture offset into a bitstream, wherein a value of zero for the syntax element indicates wrap-around motion compensation is not used and a value other than zero for the syntax element indicates the reference picture offset value in units of a minimum coding block size.

In one example, a method comprises parsing a value of a syntax element indicating the reference picture offset from a bitstream, wherein a value of zero for the syntax element indicates wrap-around motion compensation is not used and a value other than zero for the syntax element indicates the reference picture offset value in units of a minimum coding block size, and determining the reference picture offset value from the parsed value.

In one example, a device for reconstructing video data comprises one or more processors configured to parse a value of a syntax element indicating the reference picture offset from a bitstream, wherein a value of zero for the syntax element indicates wrap-around motion compensation is not used and a value other than zero for the syntax element indicates the reference picture offset value in units of a minimum coding block size, and determine the reference picture offset value from the parsed value.

In one example, a non-transitory computer-readable storage medium comprises instructions stored thereon that, when executed, cause one or more processors of a device to parse a value of a syntax element indicating the reference picture offset from a bitstream, wherein a value of zero for the syntax element indicates wrap-around motion compensation is not used and a value other than zero for the syntax element indicates the reference picture offset value in units of a minimum coding block size, and determine the reference picture offset value from the parsed value.

In one example, an apparatus comprises means for parsing a value of a syntax element indicating the reference picture offset from a bitstream, wherein a value of zero for the syntax element indicates wrap-around motion compensation is not used and a value other than zero for the syntax element indicates the reference picture offset value in units of a minimum coding block size, and means for determining the reference picture offset value from the parsed value.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region (e.g., a region must be an integer number of video blocks arranged in a rectangle). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded.

A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component.

Video blocks may be ordered within a picture and/or a region according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (also referred to as an largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In TTU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any) within the same access unit. A slice segment, like a slice, is a sequence of CTUs. Thus, in some cases, the terms slice and slice segment may be used interchangeably to indicate a sequence of CTUs. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-K1001, it has been proposed that slices shall be required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups. FIG. 1 is a conceptual diagram illustrating an example of a group of pictures including tile groups. In the example illustrated in FIG. 1, $Pic_4$ is illustrated as including two tile groups (i.e., $Tile\ Group_1$ and $Tile\ Group_2$). It should be noted that in some cases, $Tile\ Group_1$ and $Tile\ Group_2$ may be classified as slices and/or tiles.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-K1001, CTUs are partitioned according a quadtree plus multi-type tree (QTMT) structure. The QTMT in JVET-K1001 is similar to the QTBT in JEM. However, in JVET-K1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, intra prediction data or inter prediction data is used to produce reference sample values for a current video block. The difference between sample values included in a prediction generated from the reference sample values and the current video block may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-K1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 2A:
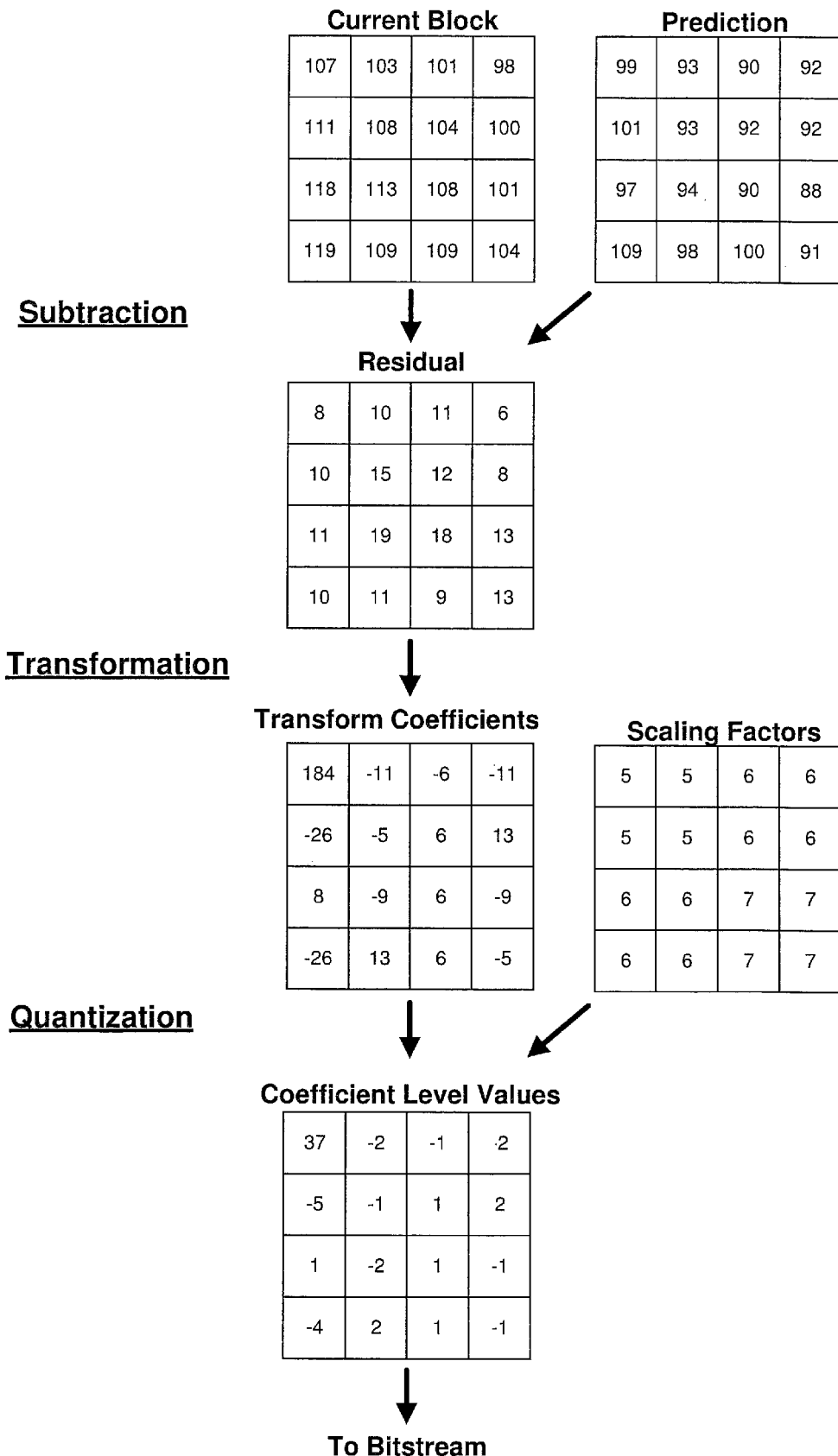
FIG. 2A is a conceptual diagram illustrating example of coding a block of video data in accordance with one or more techniques of this disclosure.
Figure 2B:
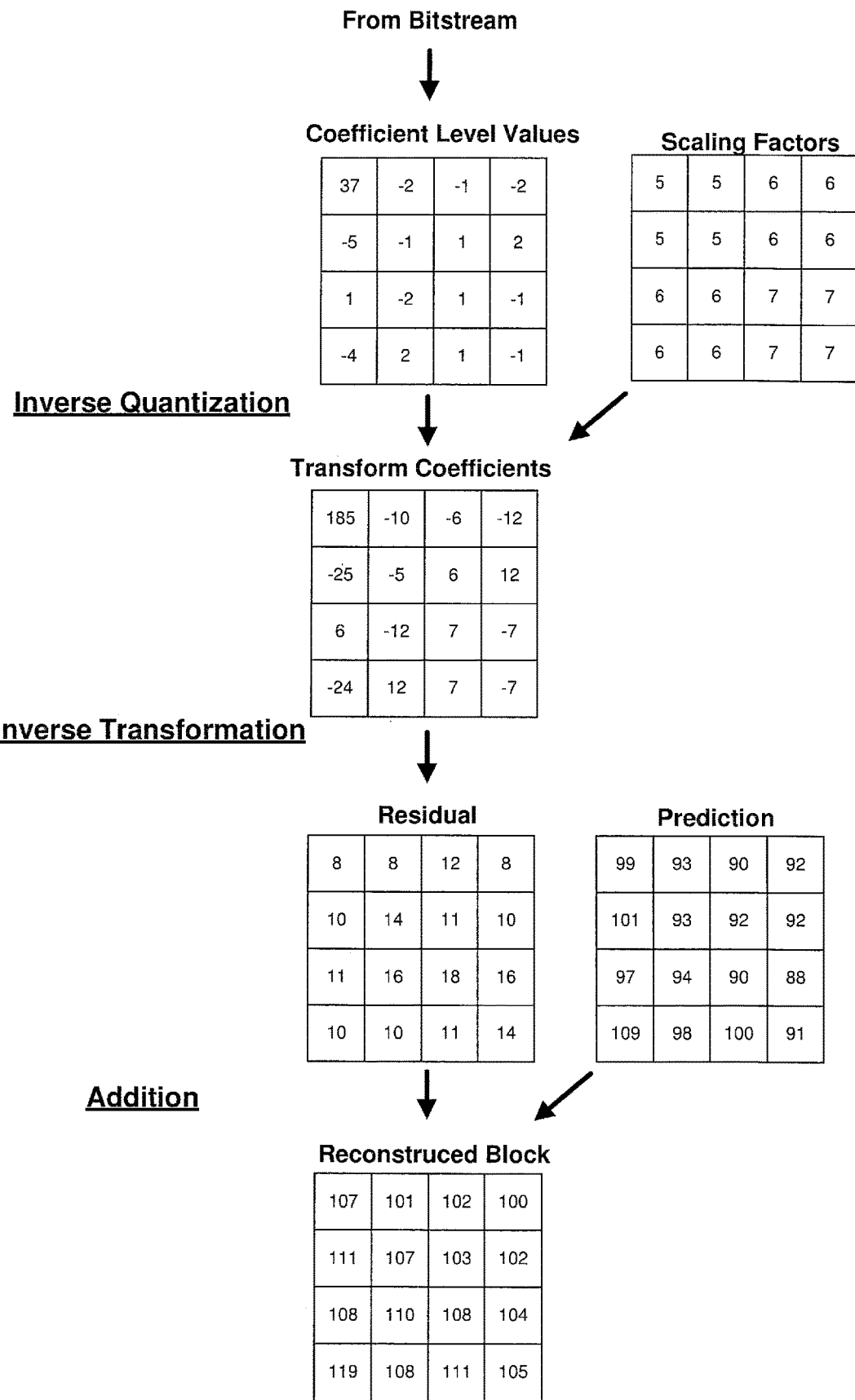
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 2A-2B, scaling is performed using an array of scaling factors.

As illustrated in FIG. 2A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265.

An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data indicate how a prediction is generating for a current video block. For intra prediction coding, an intra prediction mode may specify the location of reference samples within a picture used for generating a prediction. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JVET-K1001, defined possible intra-prediction modes for luma include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. Further, there may be various ways in which intra prediction modes for the chroma components may be derived based on the intra prediction mode for the luma component. It should be noted that the techniques described herein may be generally applicable regardless of the number of defined possible prediction modes.

For inter prediction coding, one or more previously decoded pictures, i.e., a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. In ITU-T H.265, for a P slice, there is a single reference picture list, RefPicList0 and for a B slice, there is a second independent reference picture list, RefPicList1, in addition to RefPicList0. It should be noted that for uni-prediction in a B slice, one of RefPicList0 or RefPicList1 may be used to generate a prediction. Further, it should be noted that in ITU-T H.265, during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector to be derived based on another motion vector. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). ITU-T H.265 supports two modes for motion vector prediction: a merge mode and so-called Advanced Motion Vector Prediction (AMVP). In ITU-T H.265, for both the merge mode and the AMVP for a current PB, a set of candidate blocks is derived. Both a video encoder and video decoder perform the same process to derive a set of candidates. Thus, for a current video block, the same set of candidates is generated during encoding and decoding. A candidate block includes a video block having associated motion information from which motion information used to generate a prediction for a current video block can be derived. For the merge mode in ITU-T H.265, all motion information (i.e., motion vector displacement values, reference picture indices, and reference picture lists) associated with a selected candidate is inherited as the motion information for the current PB. That is, at a video encoder, a candidate block is selected from the derived set of candidates and an index value included in the bitstream indicates the selected candidate and thus, indicates the motion information for the current PB. For AMVP in ITU-T H.265, the motion vector information for the selected candidate is used as a motion vector predictor (MVP) for the motion vector of the current PB. That is, at a video encoder, a candidate block is selected from the derived set of candidates and an index value indicating the selected candidate and a delta value (i.e., a motion vector delta (MVD)) indicating the difference between the motion vector predictor and the motion vector for the current PB are included in the bitstream. Further, for AMVP in ITU-T H.265, syntax elements identifying a reference picture are included in the bitstream. a set of candidate blocks may be derived from spatial neighboring blocks, and temporal blocks. Further, generated (or default) motion information may be used for motion vector prediction.

With respect to the equations used herein, the following arithmetic operators may be used:

+ Addition
− Subtraction
\* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

Further, the following mathematical functions may be used:

Log 2(x) the base-2 logarithm of x;

$$\text{Min}(x, y) = \begin{cases} x & ; \; x <= y \\ y & ; \; x > y \end{cases};$$

$$\text{Max}(x, y) = \begin{cases} x & ; \; x >= y \\ y & ; \; x < y \end{cases}$$

Ceil(x) the smallest integer greater than or equal to x.

$$\text{Clip3}(x, y, z) = \begin{cases} x & ; \; z < x \\ y & ; \; z > y \\ z & ; \; \text{otherwise} \end{cases}$$

$$\text{Clip3}(o, W, x) = \begin{cases} (o - (-x) \% o) \% o & ; \; x < o \\ (x - W) \% o + W - o & ; \; x > W - 1 \\ x & ; \; \text{otherwise} \end{cases}$$

With respect to the example syntax used herein, the following definitions of logical operators may be applied:

x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.

Further, the following relational operators may be applied:

> Greater than
>= Greater than or equal to
< Less than
<= Less than or equal to
== Equal to
!= Not equal to Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

u(n): unsigned integer using n bits.

ue(v): unsigned integer 0-th order Exp-Golomb-coded syntax element with the left bit first.

Figure 3:
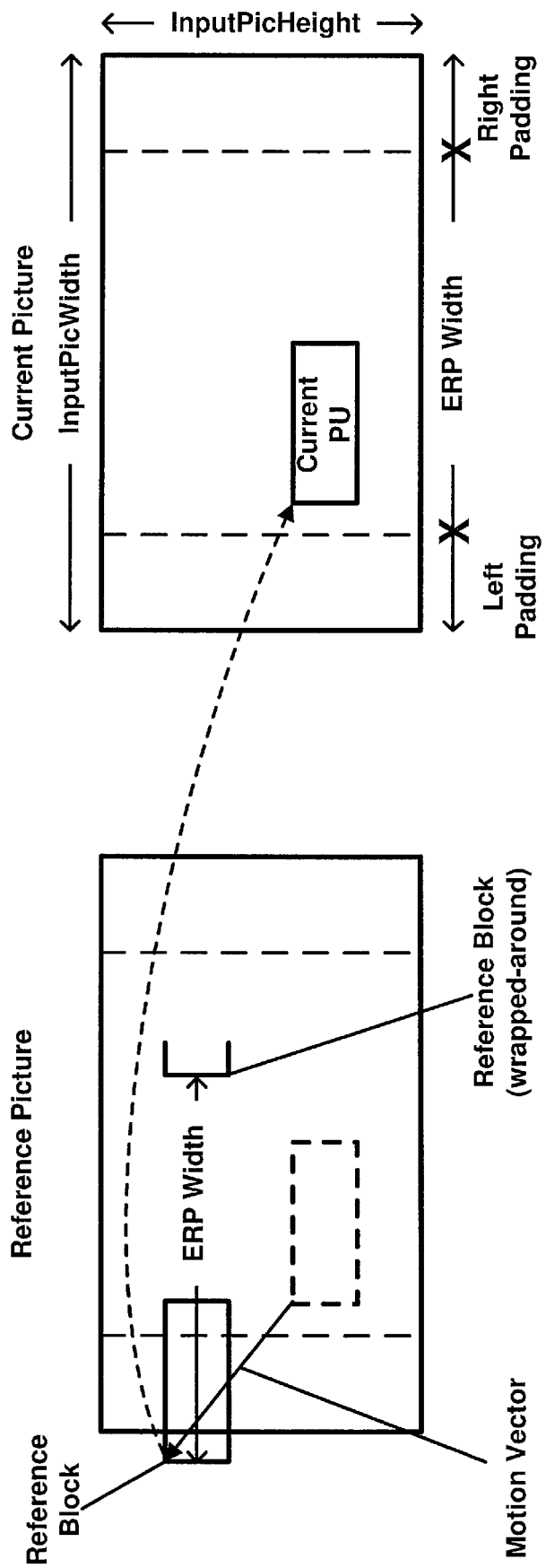
FIG. 3 is a conceptual diagram illustrating an example of inter prediction of a current picture having horizontal geometry padding.

In some cases, for example for 360 degree video, for inter prediction, horizontal geometry padding of reference pictures is used. "CE13: PERP with horizontal geometry padding of reference pictures (Test 3.3)" 12th Meeting of ISO/IEC JTC1/SC29/WG113-12 Oct. 2018, Macao, CN, document JVET-L0231-r2, which is referred to herein as JVET-L0231, describes horizontal geometry padding of a reference picture using a padded equirectangular projection (PERP). Horizontal geometry padding of a reference picture includes adding pixel values at the left and right boundaries of a picture by using, e.g., using repetitive padding or using a PERP. It should be noted that in the case of horizontal geometry padding using PERP, traditional repetitive padding may still be employed in the vertical direction. Using PERP may reduce the seam artifacts in reconstructed viewports that encompass the left and right boundaries of a equirectangular projection (ERP) picture for the padded equirectangular projection. FIG. 3 is a conceptual diagram illustrating an example of inter prediction of a current picture having horizontal geometry padding described in JVET-L0231. As illustrated in FIG. 3, a current picture has an input picture width, InputPicWidth, and height, InputPicHeight, which correspond to width and height of a padded equirectangular projected picture and a equirectangular projection width, ERP width, which corresponds to an equirectangular projected picture's width. As illustrated in FIG. 3, padding is added at the left and right boundaries of the ERP picture. As further illustrated in FIG. 3, for inter prediction, for the current prediction unit, a motion vector identifies a reference block in a reference picture. In the example illustrated in FIG. 3, the reference block is outside the left reference picture boundary. As such, as illustrated in FIG. 3, it is replaced with a "wrapped-around" reference block shifted to the right by the ERP width.

JVET-L0231 describes a reference wrap-around signaling and decoding process the may be incorporated into JVET-K1001. The signaling in JVET-L0231 allows specifying an horizontal offset, which is used for horizontal wrap-around motion compensation for inter-prediction, where the offset indicates how far part of the reference block is wrapped around to the right or left if it is outside of the reference picture boundary. Table 1 illustrates syntax elements that may be including in the sequence parameter set (SPS) to enable horizontal geometry padding of reference pictures for the ERP and PERP formats.

TABLE 1

| | Descriptor |
|---|---|
| seq_parameter_set_rbsp( ) { | |
| ... | |
| sps_ref_wraparound_enabled_flag | u(1) |
| if( sps_ref_wraparound_enabled_flag ) | |
| ref_wraparound_offset | ue(v) |
| ... | |
| } | |

With respect to Table 1, JVET-L0231 provides the following definitions for the respective syntax elements.

sps_ref_wraparound_enabled_flag equal to 1 specifies that horizontal wrap-around motion compensation is used for inter prediction. sps_ref_wraparound_enabled_flag equal to 0 specifies that this motion compensation method is not applied.

ref_wraparound_offset specifies the offset in luma samples used for computing the horizontal wrap-around position. ref_wraparound_offset shall not be equal to 0, shall not be larger than pic_width_in_luma_samples, and shall be an integer multiple of MinCbSizeY.

It should be noted that MinCbSizeY and SubWidthC are defined in JVET-L1001 as follows:

$$MinCbSizeY = 1 << MinCbLog2SizeY, \text{ where } MinCbLog2SizeY=2; \text{ and}$$

SubWidthC is equal to 1 (i.e., for monochrome and 4:4:4) or 2 (i.e., for 4:2:0 and 4:2:2)

It should be noted that in JVET-L0231 the horizontal geometry padding for PERP is the same as for ERP, with the exception that the offset should be based on the unpadded ERP width instead of the picture width to account for the size of the padded regions. JVET-L0231 further provides the following luma and chroma sample interpolation processes.

Luma Sample Interpolation Process

Inputs to this process are:

a luma location in full-sample units ($xInt_L$, $yInt_L$), a luma location in fractional-sample units ($xFrac_L$, $yFrac_L$), the luma reference sample array $refPicLX_L$.

Output of this process is a predicted luma sample value $predSampleLX_L$

The variables shift1, shift2 and shift3 are derived as follows:

The variable shift1 is set equal to Min(4, $BitDepth_Y$− 8), the variable shift2 is set equal to 6 and the variable shift3 is set equal to Max(2, 14−$BitDepth_y$).

The variable picW is set equal to pic_width_in_luma_samples and the variable picH is set equal to pic_height_in_luma_samples.

The variable xOffset is set equal to ref_wraparound_offset.

The luma interpolation filter coefficients $f_L[p]$ for each 1/16 fractional sample position p equal to $xFrac_L$ or $yFrac_L$ are specified in Table 2

TABLE 2

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

The predicted luma sample value predSampleLX$_L$ is derived as follows:
 If both xFrac$_L$ and yFrac$_L$ are equal to 0, the following applies:
  If sps_ref_wraparound_enabled_flag is equal to 0, the value of predSampleLX$_L$ is derived as follows:

predSampleLX$_L$=refPicLX$_L$[Clip3(0,picW−1,xInt$_L$)][Clip3(0,picH−1,yInt$_L$)]<<shift3

Otherwise, the value of predSampleLX$_L$ is derived as follows:

predSampleLX$_L$=refPicLX$_L$[ClipH(xOffset,picW,xInt$_L$)][Clip3(0,picH−1,yInt$_L$)]<<shift3

Otherwise if xFrac$_L$ is not equal to 0 and yFrac$_L$ is equal to 0, the following applies:
  The value of yPos$_L$ is derived as follows:

yPos$_L$=Clip3(0,picH−1,yInt$_L$)

If sps_ref_wraparound_enabled_flag is equal to 0, the value of predSampleLX$_L$ is derived as follows:

predSampleLX$_L$=(f$_L$[xFrac$_L$][0]*refPicLX$_L$[Clip3(0,picW−1,xInt$_L$−3)][yPos$_L$]+f$_L$[xFrac$_L$][1]*refPicLX$_L$[Clip3(0,picW−1,xInt$_L$−2)][yPos$_L$]+f$_L$[xFrac$_L$][2]*refPicLX$_L$[Clip3(0,picW−1,xInt$_L$−1)][yPos$_L$]+f$_L$[xFrac$_L$][3]*refPicLX$_L$[Clip3(0,picW−1,xInt$_L$)][yPos$_L$]+f$_L$[xFrac$_L$][4]*refPicLX$_L$[Clip3(0,picW−1,xInt$_L$+1)][yPos$_L$]+f$_L$[xFrac$_L$][5]*refPicLX$_L$[Clip3(0,picW−1,xInt$_L$+2)][yPos$_L$]+f$_L$[xFrac$_L$][6]*refPicLX$_L$[Clip3(0,picW−1,xInt$_L$+3)][yPos$_L$]+f$_L$[xFrac$_L$][7]*refPicLX$_L$[Clip3(0,picW−1,xInt$_L$+4)][yPos$_L$])>>shift1

Otherwise, the value of predSampleLX$_L$ is derived as follows:

predSampleLX$_L$=(f$_L$[xFrac$_L$][0]*refPicLX$_L$[ClipH(xOffset,picW,xInt$_L$−3)][yPos$_L$]+f$_L$[xFrac$_L$][1]*refPicLX$_L$[ClipH(xOffset,picW,xInt$_L$−2)][yPos$_L$]+f$_L$[xFrac$_L$][2]*refPicLX$_L$[ClipH(xOffset,picW,xInt$_L$−1)][yPos$_L$]+f$_L$[xFrac$_L$][3]*refPicLX$_L$[ClipH(xOffset,picW,xInt$_L$)][yPos$_L$]+f$_L$[xFrac$_L$][4]*refPicLX$_L$[ClipH(xOffset,picW,xInt$_L$+1)][yPos$_L$]+f$_L$[xFrac$_L$][5]*refPicLX$_L$[ClipH(xOffset,picW,xInt$_L$+2)][yPos$_L$]+f$_L$[xFrac$_L$][6]*refPicLX$_L$[ClipH(xOffset,picW,xInt$_L$+3)][yPos$_L$]+f$_L$[xFrac$_L$][7]*refPicLX$_L$[ClipH(xOffset,picW,xInt$_L$+4)][yPos$_L$])>>shift1

Otherwise if xFrac$_L$ is equal to 0 and yFrac$_L$ is not equal to 0, the value of predSampleLX$_L$ is derived as follows:
  If sps_ref_wraparound_enabled_flag is equal to 0, the value of xPos$_L$ is derived as follows:

xPos$_L$=Clip3(0,picW−1,xInt$_L$)

Otherwise, the value of xPos$_L$ is derived as follows:

xPos$_L$=ClipH(xOffset,picW,xInt$_L$)

The predicted luma sample value predSampleLX$_L$ is derived as follows:

predSampleLX$_L$=(f$_L$[yFrac$_L$][0]*refPicLX$_L$[xPos$_L$][Clip3(0,picH−1,yInt$_L$−3)]+f$_L$[yFrac$_L$][1]*refPicLX$_L$[xPos$_L$][Clip3(0,picH−1,yInt$_L$−2)]+f$_L$[yFrac$_L$][2]*refPicLX$_L$[xPos$_L$][Clip3(0,picH−1,yInt$_L$−1)]+f$_L$[yFrac$_L$][3]*refPicLX$_L$[xPos$_L$][Clip3(0,picH−1,yInt$_L$)]+f$_L$[yFrac$_L$][4]*refPicLX$_L$[xPos$_L$][Clip3(0,picH−1,yInt$_L$+1)]+f$_L$[yFrac$_L$][5]*refPicLX$_L$[xPos$_L$][Clip3(0,picH−1,yInt$_L$+2)]+f$_L$[yFrac$_L$][6]*refPicLX$_L$[xPos$_L$][Clip3(0,picH−1,yInt$_L$+3)]+f$_L$[yFrac$_L$][7]*refPicLX$_L$[xPos$_L$][Clip3(0,picH−1,yInt$_L$+4)])>>shift1

Otherwise if xFrac$_L$ is not equal to 0 and yFrac$_L$ is not equal to 0, the value of predSampleLX$_L$ is derived as follows:
  If sps_ref_wraparound_enabled_flag is equal to 0, the sample array temp[n] with n=0 . . . 7, is derived as follows:

yPos$_L$=Clip3(0,picH−1,yInt$_L$+n−3)

temp[n]=(f$_L$[xFrac$_L$][0]*refPicLX$_L$[Clip3(0,picW−1,xInt$_L$−3)][yPos$_L$]+f$_L$[xFrac$_L$][1]*refPicLX$_L$[Clip3(0,picW−1,xInt$_L$−2)][yPos$_L$]+f$_L$[xFrac$_L$][2]*refPicLX$_L$[Clip3(0,picW−1,xInt$_L$−1)][yPos$_L$]+f$_L$[xFrac$_L$][3]*refPicLX$_L$[Clip3(0,picW−1,xInt$_L$)][yPos$_L$]+f$_L$[xFrac$_L$][4]*refPicLX$_L$[Clip3(0,picW−1,xInt$_L$+1)][yPos$_L$]+f$_L$[xFrac$_L$][5]*refPicLX$_L$[Clip3(0,picW−1,xInt$_L$+2)][yPos$_L$]+f$_L$[xFrac$_L$][6]*refPicLX$_L$[Clip3(0,picW−1,xInt$_L$+3)][yPos$_L$]+f$_L$[xFrac$_L$][7]*refPicLX$_L$[Clip3(0,picW−1,xInt$_L$+4)][yPos$_L$])>>shift1

Otherwise, the sample array temp[n] with n=0 . . . 7, is derived as follows:

yPos$_L$=Clip3(0,picH−1,yInt$_L$+n−3)

temp[n]=(f$_L$[xFrac$_L$][0]*refPicLX$_L$[ClipH(xOffset,picW,xInt$_L$−3)][yPos$_L$]+f$_L$[xFrac$_L$][1]*refPicLX$_L$[ClipH(xOffset,picW,xInt$_L$−2)][yPos$_L$]+f$_L$[xFrac$_L$][2]*refPicLX$_L$[ClipH(xOffset,picW,xInt$_L$−1)][yPos$_L$]+f$_L$[xFrac$_L$][3]*refPicLX$_L$[ClipH(xOffset,picW,xInt$_L$)][yPos$_L$]+f$_L$[xFrac$_L$][4]*refPicLX$_L$[ClipH(xOffset,picW,xInt$_L$+1)][yPos$_L$]+f$_L$[xFrac$_L$][5]*refPicLX$_L$[ClipH(xOffset,picW,xInt$_L$+2)][yPos$_L$]+f$_L$[xFrac$_L$][6]*refPicLX$_L$[ClipH(xOffset,picW,xInt$_L$+3)][yPos$_L$]+f$_L$[xFrac$_L$][7]*refPicLX$_L$[ClipH(xOffset,picW,xInt$_L$+4)][yPos$_L$])>>shift1

The predicted luma sample value predSample$LX_L$ is derived as follows:

predSample$LX_L$=($f_L$[yFrac$_L$][0]*temp[0]+$f_L$[yFrac$_L$]*
  temp[1]+$f_L$[yFrac$_L$][2*temp[2]+$f_L$[yFrac$_L$][3]*
  temp[3]+$f_L$[yFrac$_L$][4]*temp[4]+$f_L$[yFrac$_L$][5]*
  temp[5]+$f_L$[yFrac$_L$][6]*temp[6]+$f_L$[yFrac$_L$][7]*
  temp[7])>>shift2

Chroma Sample Interpolation Process
Inputs to this process are:
a chroma location in full-sample units (xInt$_C$, yInt$_C$),
a chroma location in 1/32 fractional-sample units (xFrac$_C$, yFrac$_C$),
the chroma reference sample array refPicL$X_C$.
Output of this process is a predicted chroma sample value predSampleL$X_C$ The variables shift1, shift2 and shift3 are derived as follows:
The variable shift1 is set equal to Min(4, BitDepth$_C$−8), the variable shift2 is set equal to 6 and the variable shift3 is set equal to Max(2, 14−BitDepth$_C$).
The variable picW$_C$ is set equal to pic_width_in_luma_samples/SubWidthC and the variable picH$_C$ is set equal to pic_height_in_luma_samples/SubHeightC.
The variable xOffset$_C$ is set equal to ref_wraparound_offset/SubWidthC.
The luma interpolation filter coefficients $f_C$[p] for each 1/32 fractional sample position p equal to xFrac$_C$ or yFrac$_C$ are specified in Table 3.

TABLE 3

| Fractional sample position p | interpolation filter coefficients | | | |
| --- | --- | --- | --- | --- |
| | $f_C$[ p ][ 0 ] | $f_C$[ p ][ 1 ] | $f_C$[ p ][ 2 ] | $f_C$[ p ][ 3 ] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

The predicted chroma sample value predSampleL$X_C$ is derived as follows:
If both xFrac$_C$ and yFrac$_C$ are equal to 0, the following applies:
If sps_ref_wraparound_enabled_flag is equal to 0, the value of predSampleL$X_C$ is derived as follows:

predSample$LX_C$=refPicL$X_C$[Clip3(0,picW$_C$−1,xInt$_C$)]
  [Clip3(0,picH$_C$−1,yInt$_C$)]<<shift3

Otherwise, the value of predSampleL$X_C$ is derived as follows:

predSample$LX_C$=refPicL$X_C$[ClipH(xOffset$_C$,picW$_C$, xInt$_C$)][Clip3(0,picH$_C$−1,yInt$_C$)]<<shift3

Otherwise if xFrac$_C$ is not equal to 0 and yFrac$_C$ is equal to 0, the following applies:
The value of yPos$_C$ is derived as follows:

yPos$_C$=Clip3(0,picH$_C$−1,yInt$_C$)

If sps_ref_wraparound_enabled_flag is equal to 0, the value of predSampleL$X_C$ is derived as follows:

predSample$LX_C$=$f_C$[xFrac$_C$][0]*refPicL$X_C$[Clip3(0, picW$_C$−1,xInt$_C$−1)][yInt$_C$]+$f_C$[xFrac$_C$][1]*refPicL$X_C$[Clip3(0,picW$_C$−1,xInt$_C$)][yInt$_C$]+$f_C$
  [xFrac$_C$][2]*refPicL$X_C$[Clip3(0,picW$_C$−1,xInt$_C$+1)][yInt$_C$]+$f_C$[xFrac$_C$][3]*refPicL$X_C$[Clip3(0, picW$_C$−1,xInt$_C$+2)][yInt$_C$])>>shift1

Otherwise, the value of predSampleL$X_C$ is derived as follows:

predSample$LX_C$=($f_C$[xFrac$_C$][0]*refPicL$X_C$[ClipH (xOffset$_C$,picW$_C$,xInt$_C$−1)][yPos$_C$]+$f_C$[xFrac$_C$]
  [1]*refPicL$X_C$[ClipH(xOffset$_C$,picW$_C$,xInt$_C$)]
  [yPos$_C$]+$f_C$[xFrac$_C$][2]*refPicL$X_C$[ClipH(xOffset$_C$,picW$_C$,xInt$_C$+1)][yPos$_C$]+$f_C$[xFrac$_C$]
  [3]*refPicL$X_C$[ClipH(xOffset$_C$,picW$_C$,xInt$_C$+2)]
  [yPos$_C$])>>shift1

Otherwise if xFrac$_C$ is equal to 0 and yFrac$_C$ is not equal to 0, the value of predSampleL$X_C$ is derived as follows:
If sps_ref_wraparound_enabled_flag is equal to 0, the value of xPos$_C$ is derived as follows:

xPos$_C$=Clip3(0,picW$_C$−1,xInt$_C$)

Otherwise, the value of xPos$_C$ is derived as follows:

xPos$_C$=ClipH(xOffset$_C$,picW$_C$,xInt$_C$)

The predicted chroma sample value predSampleL$X_C$ is derived as follows:

predSample$LX_C$=($f_C$[yFrac$_C$][0]*refPicL$X_C$[xPos$_C$]
  [Clip3(0,picH$_C$−1,yInt$_C$−1)]+$f_C$[yFrac$_C$][1]*
  refPicL$X_C$[xPos$_C$][Clip3(0,picH$_C$−1,yInt$_C$)]+$f_C$
  [yFrac$_C$][2]*refPicL$X_C$[xPos$_C$][Clip3(0,picH$_C$−1, yInt$_C$+1)]+$f_C$[yFrac$_C$][3]*refPicL$X_C$[xPos$_C$]
  [Clip3(0,picH$_C$−1,yInt$_C$+2)])>>shift1

Otherwise if xFrac$_C$ is not equal to 0 and yFrac$_C$ is not equal to 0, the value of predSampleL$X_C$ is derived as follows:
If sps_ref_wraparound_enabled_flag is equal to 0, the sample array temp[n] with n=0 . . . 3, is derived as follows:

yPos$_C$=Clip3(0,picH$_C$−1,yInt$_C$+n−1)

temp[n]=($f_C$[xFrac$_C$][0]*refPicL$X_C$[Clip3(0,picW$_C$−1, xInt$_C$−1)][yPos$_C$]+$f_C$[xFrac$_C$][1]*refPicL$X_C$
  [Clip3(0,picW$_C$−1,xInt$_C$)][yPos$_C$]+$f_C$[xFrac$_C$][2]*
  refPicL$X_C$[Clip3(0,picW$_C$−1,xInt$_C$+1)][yPos$_C$]+$f_C$
  [xFrac$_C$][3]*refPicL$X_C$[Clip3(0,picW$_C$−1,xInt$_C$+
  2)][yPos$_C$])>>shift1

Otherwise, the sample array temp[n] with n=0 . . . 3, is derived as follows:

yPos$_C$=Clip3(0,picH$_C$−1,yInt$_C$+n−1)

temp[n]=($f_C$[xFrac$_C$][0]*refPicL$X_C$[ClipH(xOffset$_C$, picW$_C$,xInt$_C$−1)][yPos$_C$]+$f_C$[xFrac$_C$][1]*refPicL$X_C$[ClipH(xOffset$_C$,picW$_C$,xInt$_C$)][yPos$_C$]+$f_C$
  [xFrac$_C$][2]*refPicL$X_C$[ClipH(xOffset$_C$,picW$_C$, xInt$_C$+1)][yPos$_C$]+$f_C$[xFrac$_C$][3]*refPicL$X_C$
  [ClipH(xOffset$_C$,picW$_C$,xInt$_C$+2)][yPos$_C$])>>
  shift1

The predicted chroma sample value predSampleLX$_C$ is derived as follows:

predSampleLX$_C$=($f_C$[yFrac$_C$][0]*temp[0]+$f_C$[yFrac$_C$][1]*temp[1]+$f_C$[yFrac$_C$][2]*temp[2]+$f_C$[yFrac$_C$][3]*temp[3])>>shift2

The reference wrap-around signaling provided in JVET-L0231 has, at least, the following drawback: A value of zero is not allowed for a reference wrap-around offset. Since in JVET-L0231 reference wrap-around offset is signaled using a ue(v) coding, where value of 0 takes the minimum number of bits, the signaling in JVET-L0231 is not efficient as it effectively wastes (by not allowing) the value of 0 to be signaled. Further, the syntax element ref_wraparound_offset as defined in JVET-L0231 is a sample value required to be integer multiple of MinCbSizeY, which is inefficient, as various sample values which may be signaled are not allowed. Thus, the reference wrap-around signaling and decoding process described in JVET-L0231 may be less than ideal.

Figure 4:
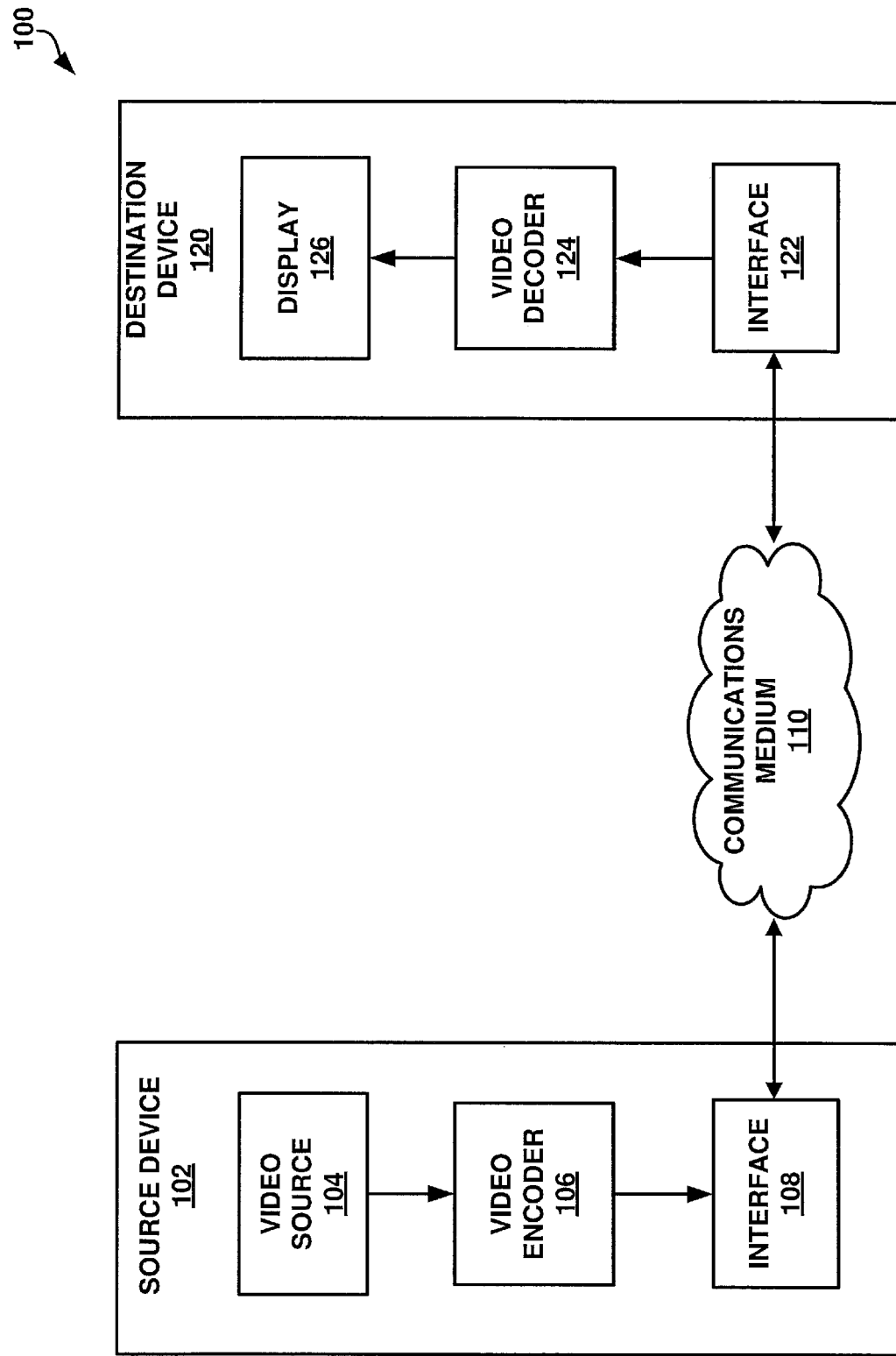
FIG. 4 is a block diagram illustrating an example of a system that may be configured to encode and decode video data according to one or more techniques of this disclosure.

FIG. 4 is a block diagram illustrating an example of a system that may be configured to code (i.e., encode and/or decode) video data according to one or more techniques of this disclosure. System 100 represents an example of a system that may perform video coding using motion vector prediction techniques described according to one or more examples of this disclosure. As illustrated in FIG. 4, system 100 includes source device 102, communications medium 110, and destination device 120. In the example illustrated in FIG. 4, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 4, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 4, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 4, video decoder 124 is described as outputting data to display 126, video decoder 124 may be configured to output video data to various types of devices and/or sub-components thereof. For example, video decoder 124 may be configured to output video data to any communication medium, as described herein.

Figure 5:
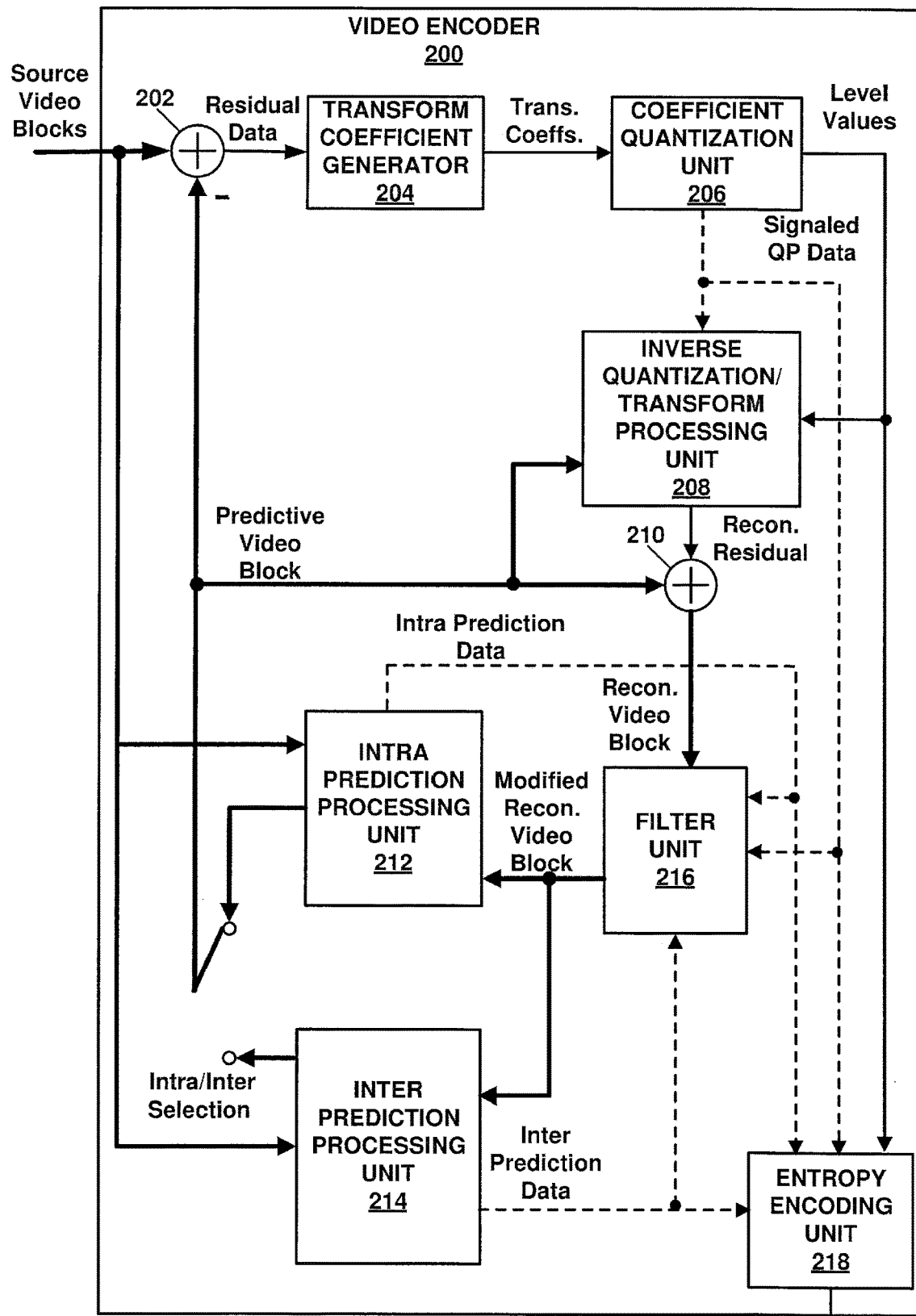
FIG. 5 is a block diagram illustrating an example of a video encoder that may be configured to encode video data according to one or more techniques of this disclosure.

FIG. 5 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 5, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 5, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 5, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 5, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 5, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 5, intra prediction processing unit 212 outputs intra prediction data (e.g., syntax elements) to entropy encoding unit 218 and transform coefficient generator 204. As described above, possible intra prediction modes may include planar prediction modes, DC prediction modes, and angular prediction modes. Inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 5). It should be noted that inter prediction processing unit 214 may further be configured to apply one or more interpolation filters to a reconstructed residual block to calculate sub-integer pixel values for use in motion estimation. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics.

Inter prediction processing unit 214 may output motion prediction data for a calculated motion vector to entropy encoding unit 218.

As described above, the reference wrap-around signaling and decoding process described in JVET-L0231 may be less than ideal. In one example, according to the techniques herein, video encoder 200 may be configured to signal the reference wrap-around offset using a minus one encoding. In particular, Table 4 illustrates an example syntax elements that may be included in the SPS (or in another parameter set and/or in tile group header in some examples) to enable horizontal geometry padding of reference pictures for the ERP and PERP formats, according to the techniques herein.

TABLE 4

| | Descriptor |
|---|---|
| seq_parameter_set_rbsp( ) { | |
| ... | |
| sps_ref_wraparound_enabled_flag | u(1) |

TABLE 4-continued

| | Descriptor |
|---|---|
| if( sps_ref_wraparound_enabled_flag ) | |
| ref_wraparound_offset_minus1 | ue(v) |
| ... | |
| } | |

With respect to Table 4, the following definitions may be used for the respective syntax elements.

sps_ref_wraparound_enabled_flag equal to 1 specifies that horizontal wrap-around motion compensation is used for inter prediction. sps_ref_wraparound_enabled_flag equal to 0 specifies that this motion compensation method is not applied.

ref_wraparound_offset_minus1 plus 1 specifies the offset in units of MinCbSizeY samples used for computing the horizontal wrap-around position. ref_wraparound_offset_minus1 shall be in the range of 0 to (pic_width_in_luma_samples/MinCbSizeY)−1, inclusive.

It should be noted that in some examples, ref_wraparound_offset_minus1 may be referred to as sps_ref_wraparound_offset_minus1. With respect to the example illustrated according to Table 4, in one example, a corresponding luma sample 8-tap interpolation filtering process may specified as follows:
Inputs to this process are:
a luma location in full-sample units ($xInt_L$, $yInt_L$),
a luma location in fractional-sample units ($xFrac_L$, $yFrac_L$),
the luma reference sample array $refPicLX_L$.
Output of this process is a predicted luma sample value $predSampleLX_L$
The variables shift1, shift2 and shift3 are derived as follows:
The variable shift1 is set equal to Min(4, $BitDepth_Y$−8), the variable shift2 is set equal to 6 and the variable shift3 is set equal to Max(2, 14−$BitDepth_Y$).
The variable picW is set equal to pic_width_in_luma_samples and the variable picH is set equal to pic_height_in_luma_samples.
The luma interpolation filter coefficients $f_L[p]$ for each 1/16 fractional sample position p equal to $xFrac_L$ or $yFrac_L$ are specified in Table 4A.

TABLE 4A

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

The luma locations in full-sample units ($xInt_i$, $yInt_i$) are derived as follows for i=0 . . . 7:

$xInt_i$=sps_ref_wraparound_enabled_flag?Clip$H$((ref_wraparound_offset_minus1+1)*Min $CbSizeY$, pic$W$,($xInt_L$+$i$−3))

:Clip3(0,pic$W$−1,$xInt_L$+$i$−3)

$yInt_i$=Clip3(0,pic$H$−1,$yInt_L$+$i$−3)

The predicted luma sample value $predSampleLX_L$ is derived as follows:
If both $xFrac_L$ and $yFrac_L$ are equal to 0, the value of $predSampleLX_L$ is derived as follows:
$predSampleLX_L$=$refPicLX_L$[$xInt_3$][$yInt_3$]<<shift3
Otherwise, if $xFrac_L$ is not equal to 0 and $yFrac_L$ is equal to 0, the value of $predSampleLX_L$ is derived as follows:

$predSampleLX_L$=($\Sigma_{i=0}^{7} f_L[xFrac_L][i]*refPicLX_L[xInt_i][yInt_3]$)>>shift1

Otherwise, if $xFrac_L$ is equal to 0 and $yFrac_L$ is not equal to 0, the value of $predSampleLX_L$ is derived as follows:

$predSampleLX_L$=($\Sigma_{i=0}^{7} f_L[yFrac_L][i]*refPicLX_L[xInt_3][yInt_i]$)>>shift1

Otherwise, if xFrac$_L$ is not equal to 0 and yFrac$_L$ is not equal to 0, the value of predSampleLX$_L$ is derived as follows:
The sample array temp[n] with n=0 . . . 7, is derived as follows:

temp[$n$]=($\Sigma_{i=0}^{7} f_L$[xFrac$_L$]*refPicLX$_L$[xInt$_i$][yInt$_n$])>>shift1

The predicted luma sample value predSampleLX$_L$ is derived as follows:

predSampleLX$_L$=($\Sigma_{i=0}^{7} f_L$[yFrac$_L$][i]*temp[i])>>shift2

Further, with respect to the example illustrated according to Table 4, in one example, a corresponding luma sample bilinear interpolation filtering process may specified as follows:
Inputs to this process are:
a luma location in full-sample units (xInt$_L$, yInt$_L$),
a luma location in fractional-sample units (xFrac$_L$, yFrac$_L$),
the luma reference sample array refPicLX$_L$,
Output of this process is a predicted luma sample value predSampleLX$_L$
The variable shift1 is set equal to Min(4, BitDepth$_Y$− 8), the variable shift2 is set equal to 6 and the variable shift3 is set equal to Max(2, 14−BitDepth$_Y$).
The variable picW is set equal to pic_width_in_luma_samples and the variable picH is set equal to pic_height_in_luma_samples.
The luma interpolation filter coefficients $f_L$[p] for each ⅟16 fractional sample position p equal to xFrac$_L$ or yFrac$_L$ are specified in Table 4B.

TABLE 4B

| Fractional sample position p | interpolation filter coefficients | |
|---|---|---|
| | $f_L$[ p ][ 0 ] | $f_L$[ p ][ 1 ] |
| 1 | 60 | 4 |
| 2 | 56 | 8 |
| 3 | 52 | 12 |
| 4 | 48 | 16 |
| 5 | 44 | 20 |
| 6 | 40 | 24 |
| 7 | 36 | 28 |
| 8 | 32 | 32 |
| 9 | 28 | 36 |
| 10 | 24 | 40 |
| 11 | 20 | 44 |
| 12 | 16 | 48 |
| 13 | 12 | 52 |
| 14 | 8 | 56 |
| 15 | 4 | 60 |

The luma locations in full-sample units (xInt$_i$, yInt$_i$) are derived as follows for i=0 . . . 1:

xInt$_i$=*sps_ref_wraparound_enabled_flag*?ClipH((ref_wraparound_offset_minus1+1)*Min CbSize*Y*, picW,(xInt$_L$+i−3))

:Clip3(0,picW−1,xInt$_L$+i)

yInt$_i$=Clip3(0,picH−1,yInt$_L$+i)

The predicted luma sample value predSampleLX$_L$ is derived as follows:
If both xFrac$_L$ and yFrac$_L$ are equal to 0, the value of predSampleLX$_L$ is derived as follows:

predSampleLX$_L$=refPicLX$_L$[xInt$_0$][yInt$_0$]<shift3

Otherwise, if xFrac$_L$ is not equal to 0 and yFrac$_L$ is equal to 0, the value of predSampleLX$_L$ is derived as follows:

predSampleLX$_L$=($\Sigma_{i=0}^{1} f_L$[xFrac$_L$][i]*refPicLX$_L$[xInt$_i$][yInt$_0$])>>shift1

Otherwise, if xFrac$_L$ is equal to 0 and yFrac$_L$ is not equal to 0, the value of predSampleLX$_L$ is derived as follows:

predSampleLX$_L$=($\Sigma_{i=0}^{1} f_L$[yFrac$_L$][i]*refPicLX$_L$[xInt$_0$][yInt$_i$])>>shift1

Otherwise, if xFrac$_L$ is not equal to 0 and yFrac$_L$ is not equal to 0, the value of predSampleLX$_L$ is derived as follows:
The sample array temp[n] with n=0 . . . 1, is derived as follows:

temp[$n$]=($\Sigma_{i=0}^{1} f_L$[xFrac$_L$][i]*refPicLX$_L$[xInt$_i$][yInt$_n$])>>shift1

The predicted luma sample value predSampleLX$_L$ is derived as follows:

predSampleLX$_L$=($\Sigma_{i=0}^{1} f_L$[yFrac$_L$][i]*temp[i])>>shift2

Further, with respect to the example illustrated according to Table 4, in one example, a corresponding chroma sample interpolation filtering process may specified as follows:
Inputs to this process are:
a chroma location in full-sample units (xInt$_C$, yInt$_C$),
a chroma location in ⅟32 fractional-sample units (xFrac$_C$, yFrac$_C$),
the chroma reference sample array refPicLX$_C$.
Output of this process is a predicted chroma sample value predSampleLX$_C$
The variables shift1, shift2 and shift3 are derived as follows:
The variable shift1 is set equal to Min(4, BitDepth$_C$−8), the variable shift2 is set equal to 6 and the variable shift3 is set equal to Max(2, 14−BitDepth$_C$).
The variable picW$_C$ is set equal to pic_width_in_luma_samples/SubWidthC and the variable picH$_C$ is set equal to pic_height_in_luma_samples/SubHeightC.
The luma interpolation filter coefficients $f_C$[p] for each ⅟32 fractional sample position p equal to xFrac$_C$ or yFrac$_C$ are specified in Table 4C.

TABLE 4C

| Fractional sample position p | interpolation filter coefficients | | | |
|---|---|---|---|---|
| | $f_C$[ p ][ 0 ] | $f_C$[ p ][ 1 ] | $f_C$[ p ][ 2 ] | $f_C$[ p ][ 3 ] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |

TABLE 4C-continued

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

The variable xOffset is set equal to ((*sps_ref_wraparound_offset_minus1*+1)*MinCbSizeY)/SubWidthC.

The chroma locations in full-sample units ($xInt_i$, $yInt_i$) are derived as follows for i=0 . . . 3:

$xInt_i = sps\_ref\_wraparound\_enabled\_flag?ClipH(xOffset,picW_C,(xInt_C+i-1))$ :$Clip3(0,picW_C-1,xInt_C+i-1)$ $yInt_i = Clip3(0,picH_C-1,yInt_C+i-1)$ The predicted chroma sample value predSampleLX$_C$ is derived as follows:
If both xFrac$_C$ and yFrac$_C$ are equal to 0, the value of predSampleLX$_C$ is derived as follows:

predSample$LX_C$=refPic$LX_C$[$xInt_i$][$yInt_i$]<<shift3

Otherwise if xFrac$_C$ is not equal to 0 and yFrac$_C$ is equal to 0, the value of predSampleLX$_C$ is derived as follows:

predSample$LX_C$=($\Sigma_{i=0}^{3} f_C$[xFrac$_C$][i]*refPic$LX_C$[$xInt_i$][$yInt_i$])>>shift1

Otherwise if xFrac$_C$ is equal to 0 and yFrac$_C$ is not equal to 0, the value of predSampleLX$_C$ is derived as follows:

predSample$LX_C$=($\Sigma_{i=0}^{3} f_C$[yFrac$_C$][i]*refPic$LX_C$[$xInt_1$][$yInt_i$])>>shift1

Otherwise if xFrac$_C$ is not equal to 0 and yFrac$_C$ is not equal to 0, the value of predSampleLX$_C$ is derived as follows:
The sample array temp[n] with n=0 . . . 3, is derived as follows:

temp[$n$]=($\Sigma_{i=0}^{3} f_C$[xFrac$_C$][i]*refPic$LX_C$[$xInt_i$][$yInt_n$])>>shift1

The predicted chroma sample value predSampleLX$_C$ is derived as follows:

predSample$LX_C$=($f_C$[yFrac$_C$][0]*temp[0]+$f_C$[yFrac$_C$][1]*temp[1]+$f_C$[yFrac$_C$][2]*temp[2]+$f_C$[yFrac$_C$][3]*temp[3])>>shift2

In one example, according to the techniques herein, video encoder 200 may be configured such that the sps_reference_wraparound_enabled_flag is not signaled and the value of zero is allowed to be signaled for syntax element ref_wraparound_offset and semantics of ref_wraparound_offset are defined such that the zero value specifies that horizontal wrap-around motion compensation is not used for inter-prediction. In particular, Table 5 illustrates an example syntax elements that may be included in the SPS (or in another parameter set and/or in tile group header in some examples) to enable horizontal geometry padding of reference pictures for the ERP and PERP formats, according to the techniques herein.

TABLE 5

| | Descriptor |
|---|---|
| seq_parameter_set_rbsp( ) { | |
| ... | |
| ref_wraparound_offset | ue(v) |
| ... | |
| } | |

With respect to Table 5, the following definitions may be used for the respective syntax element.
ref_wraparound_offset specifies the offset in units of MinCbSizeY samples used for computing the horizontal wrap-around position. ref_wraparound_offset shall be in the range of 0 to (pic_width_in_luma_samples/MinCbSizeY), inclusive. ref_wraparound_offset equal to 0 specifies that horizontal wrap-around motion compensation is not used for inter-prediction.
It should be noted that in some examples, ref_wraparound_offset may be referred to as sps_ref_wraparound_offset. With respect to the example illustrated according to Table 5, in one example, a corresponding luma sample 8-tap interpolation filtering process may be specified as follows:
Inputs to this process are:
a luma location in full-sample units ($xInt_L$, $yInt_L$),
a luma location in fractional-sample units ($xFrac_L$, $yFrac_L$),
the luma reference sample array refPicLX$_L$.
Output of this process is a predicted luma sample value predSampleLX$_L$
The variables shift1, shift2 and shift3 are derived as follows:
The variable shift1 is set equal to Min(4, BitDepth$_Y$− 8), the variable shift2 is set equal to 6 and the variable shift3 is set equal to Max(2, 14−BitDepth$_Y$).
The variable picW is set equal to pic_width_in_luma_samples and the variable picH is set equal to pic_height_in_luma_samples.
The luma interpolation filter coefficients $f_L[p]$ for each 1/16 fractional sample position p equal to xFrac$_L$ or yFrac$_L$ are specified in Table 4A.
The luma locations in full-sample units ($xInt_i$, $yInt_i$) are derived as follows for i=0 . . . 7:

$xInt_i$=ref_wraparound_offset?ClipH(ref_wraparound_offset*MinCbSizeY,picW,($xInt_L+i-3$))

:$Clip3(0,picW-1,xInt_L+i-3)$ $yInt_i=Clip3(0,picH-1,yInt_L+i-3)$

If both xFrac$_L$ and yFrac$_L$ are equal to 0, the value of predSampleLX$_L$ is derived as follows:
predSample$LX_L$=refPic$LX_L$[$xInt_3$][$yInt_3$]<<shift3
Otherwise, if xFrac$_L$ is not equal to 0 and yFrac$_L$ is equal to 0, the value of predSampleLX$_L$ is derived as follows:

predSample$LX_L$=($\Sigma_{i=0}^{7} f_L$[xFrac$_L$][i]*refPic$LX_L$[$xInt_i$][$yInt_3$])>>shift1

Otherwise, if xFrac$_L$ is equal to 0 and yFrac$_L$ is not equal to 0, the value of predSampleLX$_L$ is derived as follows:

predSample$LX_L$=($\Sigma_{i=0}^{7} f_L$[yFrac$_L$][i]*refPic$LX_L$[$xInt_3$][$yInt_i$])>>shift1

Otherwise, if $xFrac_L$ is not equal to 0 and $yFrac_L$ is not equal to 0, the value of $predSampleLX_L$ is derived as follows:

The sample array temp[n] with n=0 . . . 7, is derived as follows:

$temp[n]=(\Sigma_{i=0}^{7} f_L[xFrac_L][i]*refPicLX_L[xInt_i][yInt_n])>>shift1$

The predicted luma sample value $predSampleLX_L$ is derived as follows:

$predSampleLX_L==0 f_L[yFrac_L][i]*temp[i])>>shift2$

Further, with respect to the example illustrated according to Table 5, in one example, a corresponding luma sample bilinear interpolation filtering process may specified as follows:

Inputs to this process are:
a luma location in full-sample units ($xInt_L$, $yInt_L$),
a luma location in fractional-sample units ($xFrac_L$, $yFrac_L$),
the luma reference sample array $refPicLX_L$,
Output of this process is a predicted luma sample value $predSampleLX_L$ The variable shift1 is set equal to Min(4, $BitDepth_Y$−8), the variable shift2 is set equal to 6 and the variable shift3 is set equal to Max(2, 14−$BitDepth_Y$).

The variable picW is set equal to pic_width_in_luma_samples and the variable picH is set equal to pic_height_in_luma_samples.

The luma interpolation filter coefficients $f_L[p]$ for each 1/16 fractional sample position p equal to $xFrac_L$ or $yFrac_L$ are specified in Table 4B.

The luma locations in full-sample units ($xInt_i$, $yInt_i$) are derived as follows for i=0 . . . 1:

$xInt_i$=ref_wraparound_offset?ClipH
   (ref_wraparound_offset*MinCbSizeY,picW,
   ($xInt_L$+i−3))

:Clip3(0,picW−1,$xInt_L$+i)

$yInt_i$=Clip3(0,picH−1,$yInt_L$+i)

The predicted luma sample value $predSampleLX_L$ is derived as follows:

If both $xFrac_L$ and $yFrac_L$ are equal to 0, the value of $predSampleLX_L$ is derived as follows:

$predSampleLX_L=refPicLX_L[xInt_0][yInt_0]<<shift3$

Otherwise, if $xFrac_L$ is not equal to 0 and $yFrac_L$ is equal to 0, the value of $predSampleLX_L$ is derived as follows:

$predSampleLX_L=(\Sigma_{i=0}^{1} f_L[xFrac_L][i]*refPicLX_L[xInt_i][yInt_0])>>shift1$ Otherwise, if $xFrac_L$ is equal to 0 and $yFrac_L$ is not equal to 0, the value of $predSampleLX_L$ is derived as follows:

$predSampleLX_L=(\Sigma_{i=0}^{1} f_L[yFrac_L]i*refPicLX_L[xInt_0][yInt_i])>>shift1$ Otherwise, if $xFrac_L$ is not equal to 0 and $yFrac_L$ is not equal to 0, the value of $predSampleLX_L$ is derived as follows:

The sample array temp[n] with n=0 . . . 1, is derived as follows:

$temp[n]=(\Sigma_{i=0}^{1} f_L[xFrac_L][i]*refPicLX_L[xInt_i][yInt_n])>>shift1$

The predicted luma sample value $predSampleLX_L$ is derived as follows:

$predSampleLX_L=(\Sigma_{i=0}^{1} f_L[yFrac_L][i]*temp[i])>>shift2$

Further, with respect to the example illustrated according to Table 5, in one example, a corresponding chroma sample interpolation filtering process may specified as follows:

Inputs to this process are:
a chroma location in full-sample units ($xInt_C$, $yInt_C$),
a chroma location in 1/32 fractional-sample units ($xFrac_C$, $yFrac_C$),
the chroma reference sample array $refPicLX_C$.
Output of this process is a predicted chroma sample value $predSampleLX_C$ The variables shift1, shift2 and shift3 are derived as follows:

The variable shift1 is set equal to Min(4, $BitDepth_C$−8), the variable shift2 is set equal to 6 and the variable shift3 is set equal to Max(2, 14−$BitDepth_C$).

The variable $picW_C$ is set equal to pic_width_in_luma_samples/SubWidthC and the variable $picH_C$ is set equal to pic_height_in_luma_samples/SubHeightC.

The luma interpolation filter coefficients $f_C[p]$ for each 1/32 fractional sample position p equal to $xFrac_C$ or $yFrac_C$ are specified in Table 4C.

The variable xOffset is set equal to (ref_wraparound_offset)*MinCbSizeY)/SubWidthC.

The chroma locations in full-sample units ($xInt_i$, $yInt_i$) are derived as follows for i=0 . . . 3:

$xInt_i$=ref_wraparound_offset?ClipH(xOffset,$picW_C$,
   ($xInt_C$+i−1))

:Clip3(0,$picW_C$−1,$xInt_C$+i−1)

$yInt_i$=Clip3(0,$picH_C$−1,$yInt_C$+i−1)

The predicted chroma sample value $predSampleLX_C$ is derived as follows:

If both $xFrac_C$ and $yFrac_C$ are equal to 0, the value of $predSampleLX_C$ is derived as follows:

$predSampleLX_C=refPicLX_C[xInt_1][yInt_1]<<shift3$

Otherwise if $xFrac_C$ is not equal to 0 and $yFrac_C$ is equal to 0, the value of $predSampleLX_C$ is derived as follows:

$predSampleLX_C=(\Sigma_{i=0}^{3} f_C[xFrac_C][i]*refPicLX_C[xInt_i][yInt_j])>>shift1$ Otherwise if $xFrac_C$ is equal to 0 and $yFrac_C$ is not equal to 0, the value of $predSampleLX_C$ is derived as follows:

$predSampleLX_C=(\Sigma_{i=0}^{3} f_C[yFrac_C][i]*refPicLX_C[xInt_1][yInt_j])>>shift1$ Otherwise if $xFrac_C$ is not equal to 0 and $yFrac_C$ is not equal to 0, the value of $predSampleLX_C$ is derived as follows:

The sample array temp[n] with n=0.3, is derived as follows:

$temp[n]=(\Sigma_{i=0}^{3} f_C[xFrac_C][i]*refPicLX_C[xInt_i][yInt_a])>>shift1$

The predicted chroma sample value $predSampleLX_C$ is derived as follows:

$predSampleLX_C=(f_C[yFrac_C][0]*temp[0]+f_C[yFrac_C][1]*temp[1]+f_C[yFrac_C][2]*temp[2]+f_C[yFrac_C][3]*temp[3])>>shift2$ In one example, according to the techniques herein, video encoder 200 may be configured such that the reference wrap-around information using fixed bit-width coding. This can simplify parsing of SPS by system level. In particular, Table 6 illustrates an example syntax elements that may be included in the SPS (or in another parameter set and/or in tile group header in some examples) to enable horizontal geometry padding of reference pictures for the ERP and PERP formats, according to the techniques herein.

TABLE 6

| | Descriptor |
|---|---|
| seq_parameter_set_rbsp( ) { | |
| ... | |
|    sps_ref_wraparound_enabled_flag | u(1) |
|    if( sps_ref_wraparound_enabled_flag ) | |
|       ref_wraparound_offset_minus1 | u(v) |
| ... | |
| } | |

With respect to Table 6, the following definitions may be used for the respective syntax elements.

sps_ref_wraparound_enabled_flag equal to 1 specifies that horizontal wrap-around motion compensation is used for inter prediction. sps_ref_wraparound_enabled_flag equal to 0 specifies that this motion compensation method is not applied.

ref_wraparound_offset_minus1 plus 1 specifies the offset in units of MinCbSizeY samples used for computing the horizontal wrap-around position. ref_wraparound_offset_minus1 shall be in the range of 0 to (pic_width_in_luma_samples/MinCbSizeY)−1, inclusive. The length of the ref_wraparound_offset_minus1 syntax element is Ceil(Log 2 ((pic_width_in_luma_samples/MinCbSizeY)−1)) bits.

In another example, Table 7 illustrates an example syntax elements that may be included in the SPS (or in another parameter set and/or in tile group header in some examples) to enable horizontal geometry padding of reference pictures for the ERP and PERP formats, according to the techniques herein.

TABLE 7

| | Descriptor |
|---|---|
| seq_parameter_set_rbsp( ) { | |
| ... | |
|    ref_wraparound_offset | ue(v) |
| ... | |
| } | |

With respect to Table 7, the following definitions may be used for the respective syntax element.

ref_wraparound_offset specifies the offset in units of MinCbSizeY samples used for computing the horizontal wrap-around position. ref_wraparound_offset shall be in the range of 0 to (pic_width_in_luma_samples/MinCbSizeY), inclusive. The length of the ref_wraparound_offset syntax element is Ceil(Log 2 (pic_width_in_luma_samples/MinCbSizeY)). ref_wraparound_offset equal to 0 specifies that horizontal wrap-around motion compensation is not used for inter-prediction.

It should be noted that with respect to the examples above, in some cases, instead of defining ref_wraparound_offset or ref_wraparound_offset_minus1 in units of MinCbSizeY, these syntax elements may be defined in units of (MinCbSizeY/SubWidthC).

As provided above, JVET-L0231 provides the following luma and chroma sample interpolation processes. For each of the examples described above, the luma and chroma sample interpolation processes may be modified accordingly. In particular, for each respective corresponding example, in the interpolation processes above:

the variable xOffset is set equal to one of:

(ref_wraparound_offset_minus1+1)*MinCbSizeY; or (ref_wraparound_offset)*MinCbSizeY and the variable $xOffset_C$ is set equal to one of ((ref_wraparound_offset_minus1+1)*MinCbSizeY)/SubWidthC; or ((ref_wraparound_offset)*MinCbSizeY)/SubWidthC Further, in one example, according to the techniques herein picture width and height may be signaled using the following syntax elements.

pic_width_in_mincbsizey_samples specifies the width of each decoded picture in units of MinCbSizeY samples. pic_width_in_mincbsizey_samples shall not be equal to 0.

pic_height_in_mincbsizey_samples specifies the height of each decoded picture in units of MinCbSizeY samples. pic_height_in_mincbsizey_samples shall not be equal to 0.

The variables PicWidthInLumaSamples and PicHeightInLumaSamples are derived as follows:

PicWidthInLumaSamples=
   pic_width_in_mincbsizey_samples*MinCbSizeY

PicHeightInLumaSamples=
   pic_height_in_mincbsizey_samples*MinCbSizeY

Where the variable PicWidthInLumaSample would replace all instances of pic_width_in_luma_samples in JVET-K1001 and the variable PicHeightInLumaSample would replace all instances of pic_height_in_luma_samples in JVET-K1001.

Further, in one example, instead of defining pic_width_in_mincbsizey_samples and pic_height_in_mincbsizey_samples, in units of MinCbSizeY, these syntax elements may be defined in units of (MinCbSizeY/SubWidthC).

Referring again to FIG. 5, as illustrated in FIG. 5, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner video encoder 200 represents an example of a device configured to determine a reference picture offset value, and encode a value of a syntax element indicating the reference picture offset into a bitstream, wherein a value of zero for the syntax element indicates wrap-around motion compensation is not used and a value other than zero for the syntax element indicates the reference picture offset value in units of a minimum coding block size.

Figure 6:
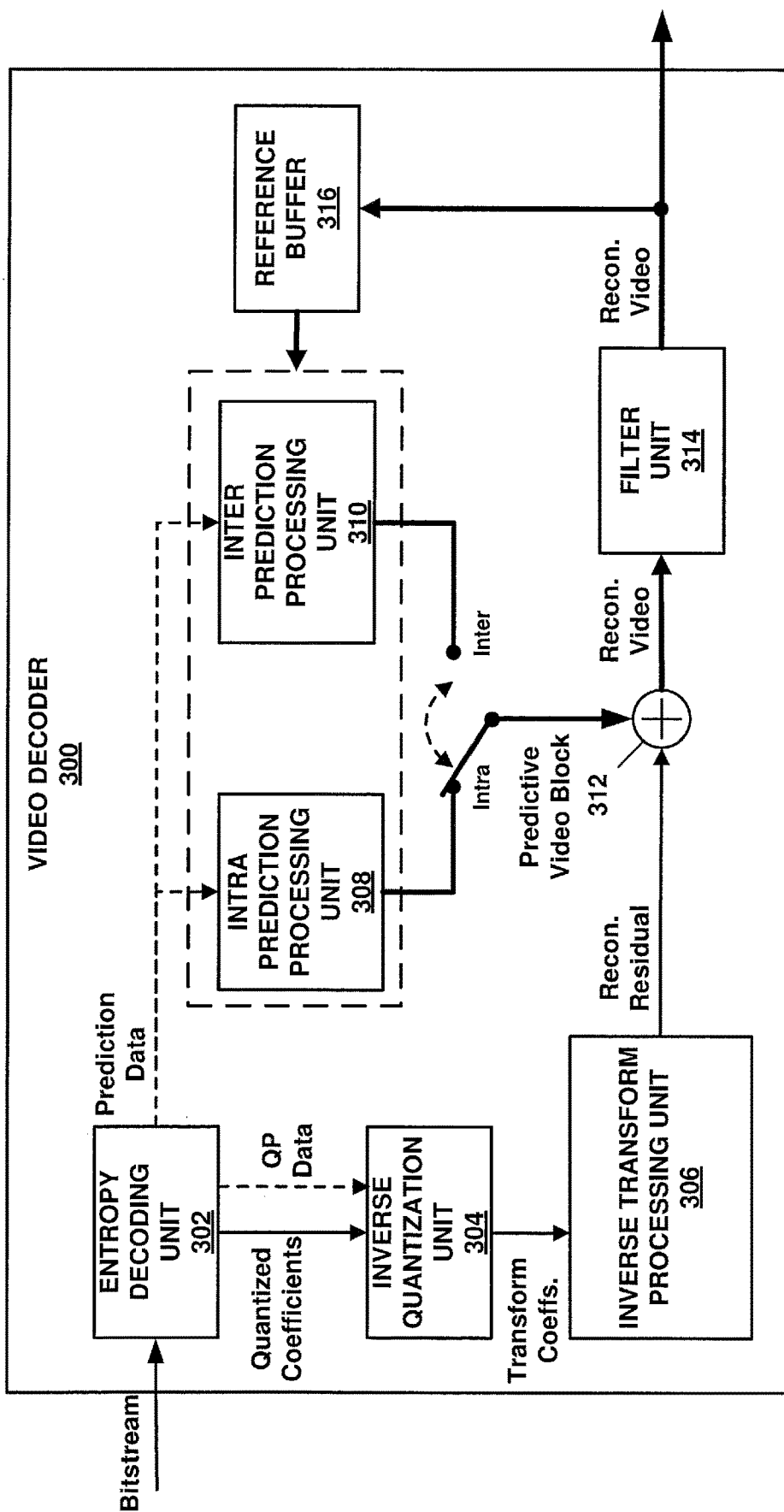
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 6 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or subcomponents thereof to a particular hardware or software architecture. Functions of video decoder 300 may be realized using any combination of hardware, firmware, and/or software implementations.

As illustrated in FIG. 6, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 13, reconstructed residual data may be provided to summer 312. Summer 312 may add reconstructed residual data to a predictive video block and generate reconstructed video data.

As describe above, a predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

As described above, video decoder 300 may parse an encoded bitstream where the encoded bitstream is generated based on the techniques described above and as described above, video encoder 200 may generate a bitstream according to techniques described above. Thus, video decoder 300 may be configured to perform motion vector prediction according to techniques described above. In this manner video decoder 300 represents an example of a device configured to parse a value of a syntax element indicating the reference picture offset from a bitstream, wherein a value of zero for the syntax element indicates wrap-around motion compensation is not used and a value other than zero for the syntax element indicates the reference picture offset value in units of a minimum coding block size, and determine the reference picture offset value from the parsed value.

Referring again to FIG. 6, filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 6 a reconstructed video block may be output by video decoder 300.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Application No. 62/755,240 on Nov. 2, 2018, No. 62/784,072 on Dec. 21, 2018, the entire contents of which are hereby incorporated by reference.

The invention claimed is:

1. A method of deriving prediction sample values for decoding video data, the method comprising:
    decoding a reference wraparound offset syntax specifying an offset used for computing a horizontal wrap-around position, wherein a maximum value of the reference wraparound offset syntax is determined based on a quotient obtained by dividing a width of each decoded picture by a minimum coding block size;
    deriving a luma location based on a product of a value of the reference wraparound offset syntax and the minimum coding block size; and
    deriving a predicted luma sample value by using the luma location.

2. The method of claim 1, wherein the luma location is derived for a luma sample bilinear interpolation process.

3. The method of claim 1, further comprising:
    setting an offset variable equal to a value obtained by dividing the product of the value of the reference wraparound offset syntax and the minimum coding block size by a width value; and
    deriving a chroma location by using the offset variable, wherein the width value is specified based on a chroma format.

4. The method of claim 3, wherein the chroma format includes one of a 4:2:0 format, a 4:2:2 format and a 4:4:4 format.

5. A method of deriving prediction sample values for encoding data, the method comprising:
    encoding a reference wraparound offset syntax specifying an offset used for computing a horizontal wrap-around position, wherein a maximum value of the reference wraparound offset syntax is determined based on a quotient obtained by dividing a width of each decoded picture by a minimum coding block size;
    deriving a luma location based on a product of a value of the reference wraparound offset syntax and the minimum coding block size; and
    deriving a predicted luma sample value by using the luma location.

6. A device for deriving prediction sample values for decoding video data, the device comprising:
    one or more processors; and
    a storage device coupled to the one or more processors and storing a program which, when executed by the one or more processors, causes the device to:
        decode a reference wraparound offset syntax specifying an offset used for computing a horizontal wrap-around position, wherein a maximum value of the reference wraparound offset syntax is determined based on a quotient obtained by dividing a width of each decoded picture by a minimum coding block size;

derive a luma location based on a product of a value of the reference wraparound offset syntax and the minimum coding block size; and derive a predicted luma sample value by using the luma location.

7. The method of claim 1, wherein the maximum value of the reference wraparound offset syntax is further determined by subtracting a positive number from the quotient.

8. The method of claim 5, wherein the luma location is derived for a luma sample bilinear interpolation process.

9. The method of claim 5, further comprising:

setting an offset variable equal to a value obtained by dividing the product of the value of the reference wraparound offset syntax and the minimum coding block size by a width value; and deriving a chroma location by using the offset variable, wherein the width value is specified based on a chroma format.

10. The method of claim 9, wherein the chroma format includes one of a 4:2:0 format, a 4:2:2 format and a 4:4:4 format.

11. The method of claim 5, wherein the maximum value of the reference wraparound offset syntax is further determined by subtracting a positive number from the quotient.

12. The device of claim 6, wherein the luma location is derived for a luma sample bilinear interpolation process.

13. The device of claim 6, further comprising:

setting an offset variable equal to a value obtained by dividing the product of the value of the reference wraparound offset syntax and the minimum coding block size by a width value; and deriving a chroma location by using the offset variable, wherein the width value is specified based on a chroma format.

14. The device of claim 13, wherein the chroma format includes one of a 4:2:0 format, a 4:2:2 format and a 4:4:4 format.

15. The device of claim 6, wherein the maximum value of the reference wraparound offset syntax is further determined by subtracting a positive number from the quotient.

* * * * *